United States Patent
Doerr

(10) Patent No.: US 6,836,600 B2
(45) Date of Patent: Dec. 28, 2004

(54) OPTICAL COUPLER WITH LOW LOSS INTERCONNECTIONS

(75) Inventor: Christopher Richard Doerr, Middletown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 104 days.

(21) Appl. No.: 10/387,667

(22) Filed: Mar. 13, 2003

(65) Prior Publication Data

US 2004/0179780 A1 Sep. 16, 2004

(51) Int. Cl.[7] .......................... G02B 6/36; H01L 21/00; H04J 14/02
(52) U.S. Cl. ............................ 385/46; 385/43; 385/50; 385/14; 385/48; 385/129; 438/31; 398/79; 398/82
(58) Field of Search ............................. 385/46, 42, 37, 385/43, 39, 48, 50; 438/31, 32

(56) References Cited

U.S. PATENT DOCUMENTS

| | | | | |
|---|---|---|---|---|
| 4,904,042 A | | 2/1990 | Dragone | 385/46 X |
| 5,136,671 A | * | 8/1992 | Dragone | 385/46 |
| 5,745,618 A | | 4/1998 | Li | 385/46 |
| 5,889,906 A | * | 3/1999 | Chen | 385/28 |
| 5,987,050 A | * | 11/1999 | Doerr et al. | 372/108 |
| 6,058,233 A | * | 5/2000 | Dragone | 385/46 |
| 6,141,467 A | * | 10/2000 | Doerr | 385/24 |
| 6,240,118 B1 | * | 5/2001 | Doerr et al. | 372/64 |
| 6,385,373 B1 | * | 5/2002 | Doerr et al. | 385/46 |
| 6,396,977 B1 | * | 5/2002 | Dragone | 385/24 |
| 6,434,303 B1 | * | 8/2002 | Temkin et al. | 385/43 |
| 6,493,487 B1 | * | 12/2002 | Temkin et al. | 385/37 |
| 6,553,165 B1 | * | 4/2003 | Temkin et al. | 385/46 |
| 2003/0138205 A1 | * | 7/2003 | Dragone | 385/37 |
| 2003/0194181 A1 | * | 10/2003 | Dragone | 385/37 |

OTHER PUBLICATIONS

H.S. Kim et al., "Actively gain–flattened erbium–doped fiber amplifier over 35 nm by using all–fiber acoustooptic tunable filters," IEEE Photon. Technol. Lett., vol. 10, pp. 790–792, Jun. 1998.

M.C. Parker et al., "Dynamic holographic spectral equalization for WDM," IEEE Photon. Technol. Lett., vol. 9, pp. 529–531, 1997.

J.E. Ford et al., "Dynamic spectral power equalization using micro–opto–mechanics," IEEE Photon. Technol. Lett., vol. 10, pp. 1440–1442, Oct. 1998.

T. Huang et al., "Performance of a liquid–crystal optical harmonic equalizer," Optical Fiber Communication Conference, PD29–1–3, 2001.

K. Inoue et al., "Tunable gain equalization using a Mach–Zehnder optical filter in multistage fiber amplifiers," IEEE Photon. Technol. Lett., vol. 3, pp. 718–720, 1991.

A. Ranalli and B. Fondeur, "Planar tapped delay line based, actively reconfigurable gain–flattening filter," European Conference on Optical Communication, 2000.

B.J. Offrein, et al., "Adaptive gain equalizer in high–index–contrast SiON Technology," IEEE Photon. Technol. Lett., vol. 12, pp. 504–506, 2000.

C.R. Doerr et al., "An automatic 40–wavelength channelized equalizer," IEEE Photon. Technol. Lett., vol. 12, pp. 1195–1197, 2000.

(List continued on next page.)

Primary Examiner—Brian M. Healy

(57) ABSTRACT

An apparatus for optical coupling having a first array of individual waveguides optically communicating with a free space region at a first junction and each waveguide having a tapered region proximate the junction where a gap spacing between tapered regions of adjacent individual waveguides is substantially constant is proposed. The gap spacing is a minimum amount of space between adjacent individual waveguides. The first array of individual waveguides also has a horn region immediately proximate the tapered region and opposite the first junction with an increasing width whose maximum establishes the gap spacing.

20 Claims, 2 Drawing Sheets

OTHER PUBLICATIONS

C.R. Doerr et al., "Integrated WDM dynamic power equalizer with potentially low insertion loss," IEEE Photon. Technol. Lett., vol. 10, pp. 1443–1445, Oct. 1998.

C.R. Doerr et al., "Arrayed waveguide dynamic gain equalization filter with reduced insertion loss and increased dynamic range," IEEE Photon. Technol. Lett., vol., 13, pp. 329–331, Apr. 2001.

C.R. Doerr et al., "Dynamic Wavelength equalizer in silica using the single–filtered–arm interferometer," IEEE Photon. Technol. Lett., vol. 11, pp. 581–583, May 1999.

A. Sugita et al., "Very low insertion loss arrayed–waveguide grating with vertically tapered waveguides," IEEE Photon. Technol. Lett., vol. 12, pp. 1180–1182, Sep. 2000.

Y. Inuoe et al., "Polarization sensitivity of a silica waveguide thermooptic phase shifter for planar lightwave circuits," IEEE Photon. Technol. Lett., vol. 4, pp. 36–38, Jan. 1992.

K. Koyama et al., "Frequency chirping in external modulators," J. Lightwave Technol., vol. 6, p. 87, 1988.

* cited by examiner

US 6,836,600 B2

OPTICAL COUPLER WITH LOW LOSS INTERCONNECTIONS

FIELD OF THE INVENTION

This invention relates generally to optical transmission systems and, more specifically, to low insertion loss optical couplers.

BACKGROUND OF THE INVENTION

Optical couplers are optical transmission system components used to connect planar arrangements of waveguides. As shown in FIG. 1, a star coupler 100 (discussed in detail in U.S. Pat. No. 4,904,042, issued Feb. 27, 1990 to Dragone, and herein incorporated by reference) has a free space region 110 bounded by an input junction 102 for receiving incoming signal(s) from a plurality of individual input waveguides 106 and an output junction 104 for power splitting the input signal(s) and/or coupling portions of the signal(s) to a plurality of individual output waveguides 108. Insertion loss (a reduction in the power of a signal propagating through the coupler 100) typically occurs at the input junction 102 because of the abrupt change in the physical dimensions of the individual input waveguides as compared to the free space region 110. The abrupt change causes a scattering of light associated with the signal, subsequently reducing power.

In a theoretically ideal coupler, waveguides approaching a free space region are nearly parallel to one another. The waveguides are shaped so that they are narrow at first and then increase in width until the gap between them is zero (a point which defines for example, the input junction). Zero gap width along with non-converging waveguides provides for a theoretical insertion loss of zero.

As shown in FIG. 2, the input junction 102 to the free space region 110 of conventional star coupler 100 is essentially arc-shaped. A first individual waveguide $106_1$ and a second individual waveguide $106_2$ are shown in detail as having respective uniform waveguide sections 202 and horn sections 204. The uniform waveguide sections 202 have a substantially uniform waveguide width Wu. The horn sections 204 change to a different width Wt as they extend from the uniform waveguide sections 202 to the input junction 102. The radial nature of the geometry of the individual waveguides along the input junction 102 forces them to converge too quickly for the transition to be gradual and thus truly have zero loss. Additionally, the limitations of lithography (a process used to fabricate coupler 100) create a non-zero gap 206 between the first and second individual waveguides $106_1$, $106_2$. Even if lithography permitted a zero gap, an average value of this gap 206 as the waveguides converge would be finite which is counter to the desired theoretical zero value gap (i.e., the waveguides are overtly non-parallel); thus, creating the insertion loss condition.

SUMMARY OF THE INVENTION

These and other deficiencies of the prior art are addressed by the present invention of an apparatus for optical coupling having a first array of individual waveguides optically communicating with a free space region at a first junction, each waveguide having a tapered region proximate the junction where a gap spacing between tapered regions of adjacent individual waveguides is substantially constant. In one embodiment, the tapered region of each individual waveguide has a length D of approximately 250 µm. The gap spacing is a minimum amount of space between adjacent individual waveguides and in one embodiment of the invention in the range of approximately 1.5–3.5 µm. The first array of individual waveguides also has a horn region immediately proximate the tapered region and opposite the first junction with a changing waveguide width. The first array of individual waveguides also has a waveguide region immediately proximate the horn region and opposite the tapered region with a width that is nearly uniform along its entire length. In one embodiment, the width of the tapered region is decreased (tapers) as a function of length as it extends away from the horn region. The apparatus may also have a second array of individual waveguides communicating with the free space region at a second junction.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The subject invention will be primarily described within the context of an optical star coupler which may be used in wavelength-division multiplexed (WDM) and dense WDM (DWDM) optical communications systems. However, it will be appreciated by those skilled in the art that the invention may be advantageously employed in any optical communications system in which it is desirable to minimize insertion losses at the coupling of two or more optical components.

Figure 3:
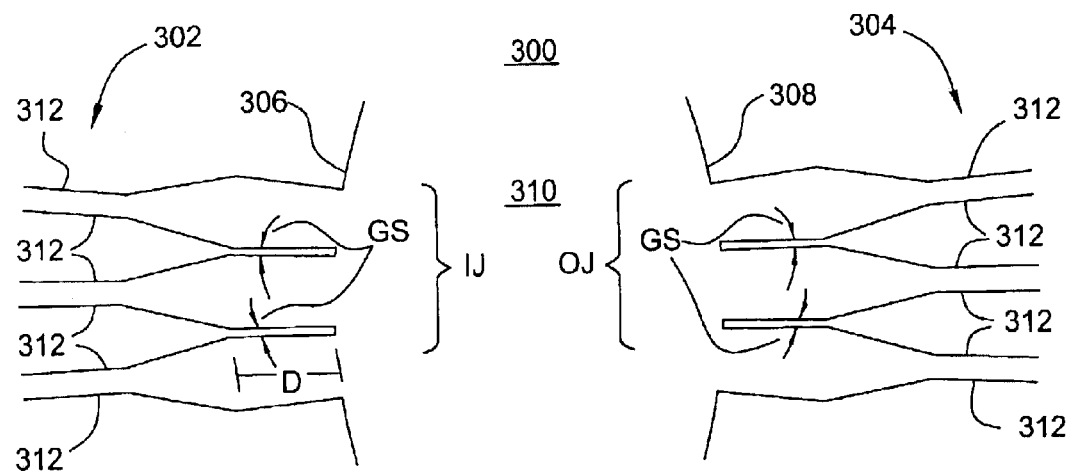
FIG. 3 depicts a diagram of an optical coupler according to one embodiment of the present invention.

FIG. 3 depicts a diagram of an optical star coupler 300 according to the one embodiment of the present invention. Specifically, the coupler 300 of FIG. 3 comprises a plurality of individual input waveguides 302 defined by a plurality of waveguide walls 312, a free space region 310 and a plurality of individual output waveguides 304 also defined by a plurality of waveguide walls 312. The plurality of input waveguides 302 communicate with the free space region 310 at a first surface 306 that defines an input junction IJ. The plurality of output waveguides 304 communicate with the free space region 310 at a second surface 308 that defines an output junction OJ.

Planar waveguides such as input waveguides 302 and output waveguides 304 comprise, illustratively, doped-silica waveguides fabricated with silicon optical bench (SiOB) technology and the like. Doped-silica construction is preferred due to a number of attractive properties including low cost, low loss, low birefringence, stability, and compatibility for coupling to fiber. However, this coupler can be made using any planar lightwave circuit technology, such as silicon-on-insulator, indium phosphide, polymer, and lithium niobate.

The performance of the coupler 300 is contingent upon the waveguide dimensions, such as the height and width of the waveguide core and the refractional difference of the refractive index between the core and the cladding of the waveguide. However, it is the gap spacing GS between the individual waveguides (input 302 and/or output 304) and more specifically the waveguide walls 312 that is the primary focus of the subject invention. Specifically, the individual waveguides (302 and/or 304) are fashioned such that their widths are increased until the gap spacing GS between each individual waveguide is at an optimum distance for maintaining substantially parallel waveguide walls proximate the input junction IJ. In one embodiment of the invention, the gap spacing GS is in the range of approximately 0.5–3.5 μm and in one embodiment, preferably 2.5 μm. The gap spacing in another embodiment is the minimum spacing attainable by lithography techniques and may be any width considered applicable and optimal to achieve the desired low insertion loss characteristics.

Once the optimal gap spacing GS has been established, it is maintained along adjacent individual waveguides for a predetermined distance D. In one embodiment of the invention the desired distance is in the range of approximately 100–2000 μm and in one embodiment preferably 250 μm. The optimal gap spacing GS is maintained until the individual waveguides reach the free space region 310. This improvement is realized by reshaping each of the individual waveguides in such a manner so as to slow down the rapid convergence of the waveguide walls near the free space regions thus reducing the average gap spacing therebetween to a minimum. Although FIG. 3 draws the coupler as being symmetric, it is possible that only one side of the coupler uses the proposed tapering design.

Figure 4:
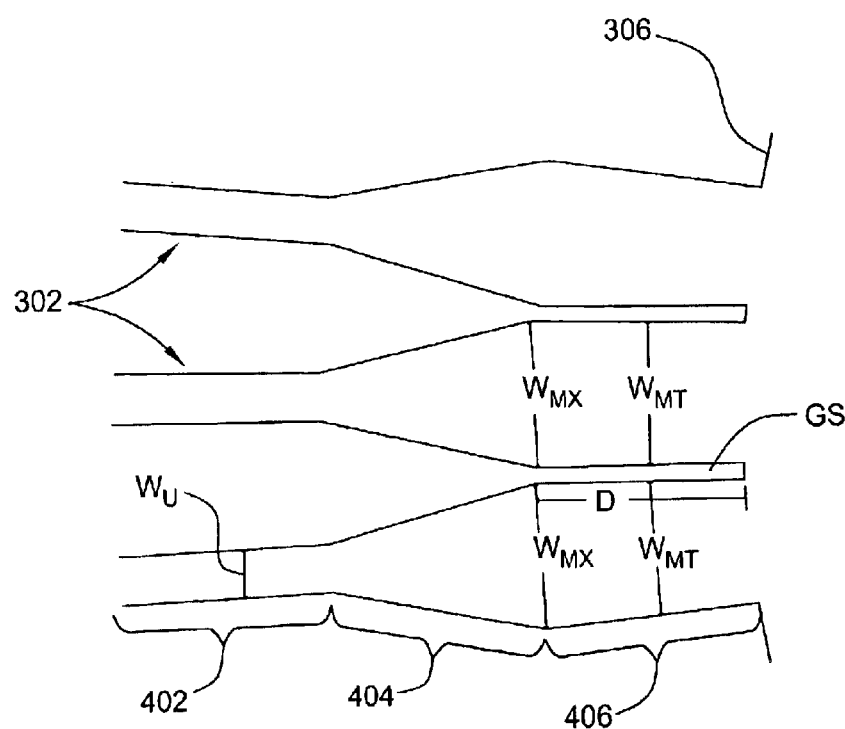
FIG. 4 depicts a detailed view of the optical coupler of FIG. 3.

FIG. 4 depicts a detailed view of a portion of the optical coupler 300 of FIG. 3 to more clearly depict the physical characteristics described above. Specifically, a portion of the plurality of individual input waveguides 302 are shown proximate the first surface 306 that defines the input junction IJ. Each of the individual input waveguides 302 are segmented into three regions. A first region 402 comprises a primary waveguide region that extends for a majority of the waveguide's length at a substantially uniform width Wu to propagate signals in the expected manner. A second region 404 comprises a horn region that extends from an end of the primary waveguide region 402 to a beginning of a third region 406 and has an increasing width, typically with a quadratic change in width with length. The third region 406 comprises a tapered region that extends from the end of the horn region 404 to the interface junction IJ. The width of the horn region 404 increases from the waveguide's uniform width Wu to a maximum width $W_{MX}$ at the beginning of the third region 406. This maximum width $W_{MX}$ is realized in each of the plurality of individual input waveguides 302 such that $W_{MX}$ corresponds to the maximum width of the waveguide resulting in the optimal amount of gap spacing GS. Preferably, the optimal gap spacing GS is that which is possible under known lithographic techniques and is finite as discussed above.

The third (tapered) region 406 exhibits an overall width $W_{MT}$ that is varied. amongst the input waveguides 302 so as to maintain the gap spacing GS between each of the individual input waveguides 302 along their respective predetermined distances D. That is, the tapered region 406 width $W_{MT}$ is varied slightly in each individual input waveguide 302 to compensate for the small differences in the linear path of each individual input waveguide 302 as it follows along the arced surface 306 that forms the input junction IJ. In one embodiment of the invention, $W_{MT}$ is decreased along length D as the individual waveguides extend away from the second region 404 in order to substantially maintain a constant gap. In one embodiment of the invention, $W_{MT}$ is decreased in the range of approximately 0.5–1.0 μm with respect to $W_{MX}$. In summation, a relationship between $W_{MT}$ and D is realized to optimize the invention. Specifically, $$D = \frac{(3W_{MT}^2)}{\lambda}$$

gives a reasonable approximation of D where λ is the wavelength of the light propagating through the specific waveguide. It will be understood by those skilled in the art that similar physical arrangement and descriptions are applicable (but not necessary) to a portion of the plurality of individual output waveguides 304 as they meet the second surface 308 that defines the output junction OJ.

Figure 1:
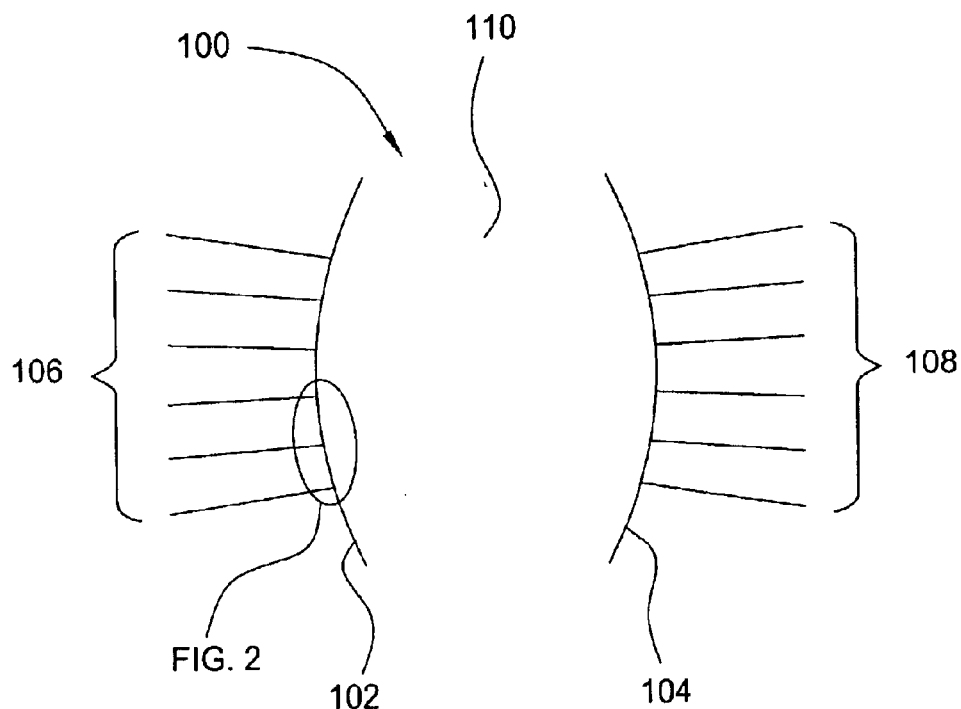
FIG. 1 depicts a schematic diagram of an optical coupler according to the prior art.
Figure 2:
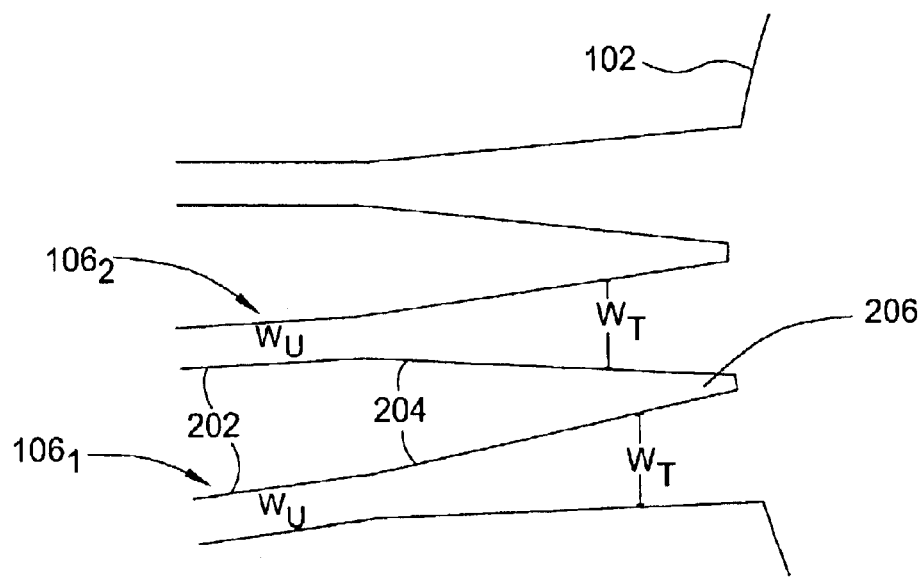
FIG. 2 depicts a detailed view of the optical coupler of FIG. 1.

The subject invention and arrangement of individual waveguides discussed above is effective for minimizing insertion loss. Two-dimensional simulations have shown that signal strength may be improved by ~0.3 dB per coupler when the device is fabricated with the physical construction as described. By keeping the gap spacing GS nearly constant along the predetermined distance D, the individual waveguides have a more parallel physical orientation to one another than realized in the prior art. This physical orientation lowers the average (or effective) gap between individual waveguides in the coupler as compared to the gap 206 of the prior art coupler of FIG. 2. Thus the transition between the waveguides and the free space region is less abrupt, resulting in less optical light scattered into unwanted spatial diffraction orders at the waveguide-free space boundary. In other words, the subject invention creates individual waveguides that do not converge as quickly as the prior art; thus resulting in a junction to the free space region that is not as abrupt as previously realizable. This physical characteristic results in reduced dispersion of light emanating from the individual waveguides at the input junction IJ and lower insertion loss.

This loss reduction technique can be combined with other techniques, such as waveguide segmentation described in U.S. Pat. No. 5,745,618, issued Apr. 28, 1988 to Y. P. Li in order to further reduce the loss.

Although various embodiments that incorporate the teachings of the present invention have been shown and described in detail herein, those skilled in the art can readily devise many other varied embodiments that still incorporate these teachings.

What is claimed is:

1. An optical device comprising:
   a first array of converging individual waveguides optically communicating with a free space region at a first junction;
   each of said individual waveguides comprising a tapered region proximate the first junction wherein;
   a gap spacing between tapered regions of adjacent individual waveguides is substantially constant.

2. The apparatus of claim 1 wherein the tapered region of each of said individual waveguides has a predetermined length.

3. The apparatus of claim 2 wherein the predetermined length is expressed as:

$$D = \frac{(3W_{MX}^2)}{\lambda}$$

where $W_{MX}$ is a width of the tapered region and λ is a wavelength of light propagating through one of the waveguides.

4. The apparatus of claim 1 wherein the gap spacing is minimized to create substantially parallel adjacent individual waveguide walls.

5. The apparatus of claim 4 wherein the gap spacing is in the range of approximately 0.5–3.5 µm.

6. The apparatus of claim 5 wherein the gap spacing is approximately 2.5 µm.

7. The apparatus of claim 1 wherein the first array of individual waveguides further comprises a horn region immediately proximate the tapered region.

8. The apparatus of claim 7 wherein the horn region further comprises an increasing width whose maximum establishes the gap spacing.

9. The apparatus of claim 7 wherein the horn region is horn shaped.

10. The apparatus of claim 1 wherein the wherein the first array of individual waveguides further comprises a waveguide region immediately proximate the horn region and opposite the tapered region.

11. The apparatus of claim 10 wherein a width of the waveguide region is nearly uniform along its entire length.

12. The apparatus of claim 2 wherein a width of the tapered region is decreased as a function of length as it extends away from the transition region.

13. The apparatus of claim 1 further comprising a second array of individual waveguides communicating with the free space region at a second junction.

14. An optical device comprising:
 a first array of converging individual waveguides optically communicating with a free space region at a first junction;
 a second array of converging individual waveguides optically communicating with said free space region at a second junction;
 each of said individual waveguides of the first array comprising a tapered region proximate the first junction and each of said individual waveguides of the second array comprising a tapered region proximate the second region wherein;
 a gap spacing between tapered regions of adjacent individual waveguides in each of said first and second arrays is substantially constant.

15. The apparatus of claim 14 wherein the tapered region of each of said individual waveguides has a predetermined length.

16. The apparatus of claim 15 wherein the predetermined length is expressed as:

$$D = \frac{(3W_{MX}^2)}{\lambda}$$

where $W_{MX}$ is a width of the tapered region and $\lambda$ is a wavelength of light propagating through one of the waveguides.

17. The apparatus of claim 14 wherein the gap spacing is in the range of approximately 0.5–3.5 µm.

18. The apparatus of claim 17 wherein the gap spacing is approximately 2.5 µm.

19. A method of making an optical device comprising:
 forming a first array of converging individual waveguides, each of said individual waveguides comprising a tapered region wherein a gap spacing between tapered regions of adjacent individual waveguides in the first array is substantially constant; and
 arranging each of said individual waveguides of the first array proximate a first junction of a free space region.

20. The method of claim 19 further comprising:
 forming a second array of converging individual waveguides comprising each of said individual waveguides comprising a tapered region wherein a gap spacing between tapered regions of adjacent individual waveguides in the second array is substantially constant; and
 arranging each of said individual waveguides of the second array proximate a second junction of the free space region.

* * * * *